Nov. 29, 1927.
D. E. LUTZLER
1,650,634
BROILER PAN
Filed Aug. 26, 1926
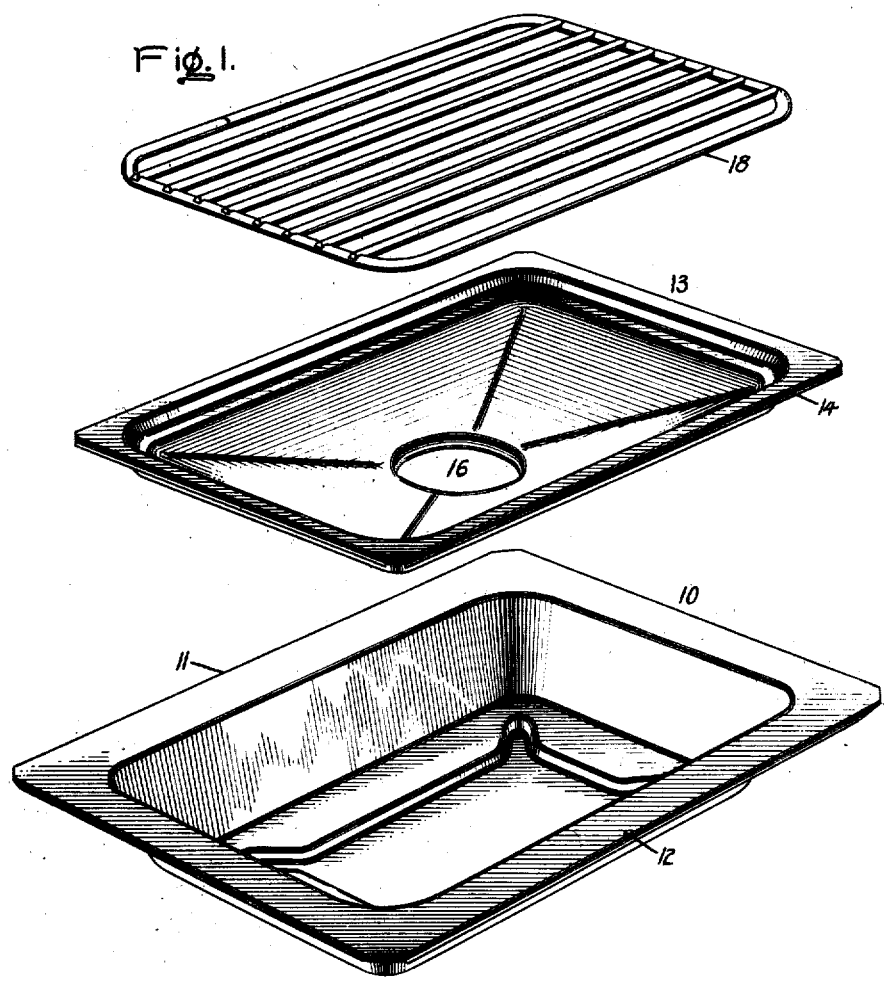
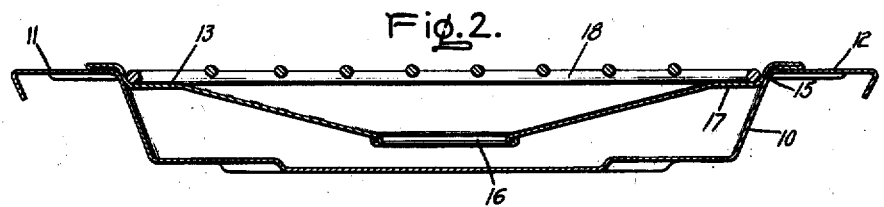
Inventor:
Dorothea E. Lutzler,
by
Her Attorney Patented Nov. 29, 1927.

1,650,634

UNITED STATES PATENT OFFICE.

DOROTHEA E. LUTZLER, OF NASHVILLE, TENNESSEE, ASSIGNOR TO EDISON ELECTRIC APPLIANCE COMPANY, INCORPORATED, OF CHICAGO, ILLINOIS, A CORPORATION OF NEW YORK.

BROILER PAN.

Application filed August 26, 1926. Serial No. 131,774.

My invention relates to broiler pans, more particularly to an attachment for broiler pans, and has for its object the provision of means for preventing or reducing the smoke nuisance due to burning of the fats and juices flowing from the hot meat.

As is well known the broiling of meat, such as steak, is attended with a very considerable smoke nuisance. This smoke is caused largely from the burning of the fats and juices escaping from the meat during the broiling operation. With the usual gas or electrically heated boiler the meat is placed on a rack or grid below the source of heat and in close proximity thereto. A pan is provided below the grid, the grid usually fitting on the pan and the pan in turn being supported in the broiler. With such arrangements the fats in the pan are exposed to the source of heat and consequently become hot enough to burn and smoke.

In carrying out my invention in one form I provide an auxiliary pan or tray which is set in the broiler pan, and may constitute an attachment therefor. This tray has its bottom wall sloping toward an aperture therein through which the juices run off into the broiler pan below where they are shielded by the tray.

For a more complete understanding of my invention reference should be had to the accompanying drawing in which Fig. 1 is an exploded view of a broiler pan embodying my invention, while Fig. 2 is a sectional view of the device shown in Fig. 1.

Referring to the drawing, I have shown my invention in one form as constituting an attachment for the usual broiler pan 10. This pan is provided with a flanged edge including flanges or horizontal supports 11 and 12 at the sides, respectively, which rest on suitable horizontal supports in the broiler and on which the pan may be pulled out for inspection during the broiling operation or for cleaning. The pan 10 itself, however, and the method of supporting it in the broiler forms no part of my invention. In accordance with my invention, I provide an attachment for the pan 10 which consists of a shallow tray 13 adapted to be set over the pan, and having a flange 14 around its edge which rests on the flanged edge of the pan. The side wall 15 of the tray, which forms a loose fit in the pan, is quite short, its primary object being to form a shoulder to properly position the tray. The tray is provided with a central aperture 16 in its bottom wall, and the bottom wall of the tray is inclined downward from all sides toward this opening. A horizontal portion 17 is formed in the bottom of the tray around its outer edge to provide a supporting shoulder for a broiler rack or grid 18 which fits loosely in the try and rests on the shoulder 17. It will be understood that the bottom wall of the tray is inclined from the shoulder 17 to the aperture 16.

With this arrangement it will be observed that the fats and the juices from the meat cooking on the grid 18 will drip onto the tray 13 and be carried by the sloping bottom wall of the tray to the central opening 16 through which they will flow into the pan. The fats and juices in the pan are protected by the tray from the direct radiation of heat from the source, and are thus shielded so that their temperature is maintained below a point where excessive burning and smoking occurs.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the annexed claims.

What I claim as new, and desire to secure by Letters Patent of the United States, is:

1. The combination with a broiler pan, of a tray fitting over said pan so as to be supported at its edges on said pan in spaced relation with the bottom thereof, said tray being provided with an aperture and having its bottom wall sloping downward toward said aperture, and a grid mounted on said tray.

2. The combination with a broiler pan of a tray fitting on said pan whereby said tray is supported in spaced relation with the bottom of said pan, a supporting flange on said tray resting on the upper edge of said pan, said tray being provided with a central aperture and having its bottom wall sloping downward toward said aperture a horizontal portion around the edge of said tray, and a grid carried by said tray having its edge resting on said horizontal portion.

3. The combination with a broiler pan, of a tray, an outer side wall on said tray fitting in said pan, a horizontal flange on said tray resting in the upper edge of said pan whereby the tray is supported in spaced relation with the bottom of said pan, said tray being provided with a central aperture and having its bottom wall sloping downward toward said aperture with the exception of an outer horizontal portion adjoining said side wall, and a grid carried by said tray having its edge resting on said horizontal portion.

In witness whereof I have hereunto set my hand this 17th day of August, 1926.

DOROTHEA E. LUTZLER.

3. The combination with a broiler pan, of a tray, an outer side wall on said tray fitting in said pan, a horizontal flange on said tray resting in the upper edge of said pan whereby the tray is supported in spaced relation with the bottom of said pan, said tray being provided with a central aperture and having its bottom wall sloping downward toward said aperture with the exception of an outer horizontal portion adjoining said side wall, and a grid carried by said tray having its edge resting on said horizontal portion.

In witness whereof I have hereunto set my hand this 17th day of August, 1926.

DOROTHEA E. LUTZLER.

CERTIFICATE OF CORRECTION.

Patent No. 1,650,634.     Granted November 29, 1927, to

DOROTHEA E. LUTZLER.

It is hereby certified that error appears in the printed specification of the above numbered patent requiring correction as follows: Page 1, line 94, claim 1, for the word "edges" read "edge"; same page, lines 101 to 103, claim 2, strike out the words "whereby said tray is supported in spaced relation with the bottom of said pan" and insert the same after the word pan and before the comma in line 104; and that the said Letters Patent should be read with these corrections therein that the same may conform to the record of the case in the Patent Office.

Signed and sealed this 27th day of December, A. D. 1927.

Seal.

M. J. Moore,
Acting Commissioner of Patents.

CERTIFICATE OF CORRECTION.

Patent No. 1,650,634.             Granted November 29, 1927, to

DOROTHEA E. LUTZLER.

It is hereby certified that error appears in the printed specification of the above numbered patent requiring correction as follows: Page 1, line 94, claim 1, for the word "edges" read "edge"; same page, lines 101 to 103, claim 2, strike out the words "whereby said tray is supported in spaced relation with the bottom of said pan" and insert the same after the word pan and before the comma in line 104; and that the said Letters Patent should be read with these corrections therein that the same may conform to the record of the case in the Patent Office.

Signed and sealed this 27th day of December, A. D. 1927.

Seal.                                       M. J. Moore,
                                             Acting Commissioner of Patents.